(12) United States Patent
Yamamoto et al.

(10) Patent No.: US 11,291,949 B2
(45) Date of Patent: Apr. 5, 2022

(54) CARBON DIOXIDE SEPARATION RECOVERY SYSTEM AND METHOD

(71) Applicants: RESEARCH INSTITUTE OF INNOVATIVE TECHNOLOGY FOR THE EARTH, Kizugawa (JP); KAWASAKI JUKOGYO KABUSHIKI KAISHA, Kobe (JP)

(72) Inventors: Shin Yamamoto, Kizugawa (JP); Hidetaka Yamada, Kizugawa (JP); Katsunori Yogo, Kizugawa (JP); Shohei Nishibe, Kobe (JP); Kazuo Tanaka, Kobe (JP); Katsuhiro Yoshizawa, Akashi (JP); Takeshi Okumura, Kobe (JP); Ryohei Numaguchi, Kobe (JP)

(73) Assignees: RESEARCH INSTITUTE OF INNOVATIVE TECHNOLOGY FOR THE EARTH, Kizugawa (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/268,533

(22) PCT Filed: Oct. 29, 2019

(86) PCT No.: PCT/JP2019/042335
§ 371 (c)(1),
(2) Date: Feb. 15, 2021

(87) PCT Pub. No.: WO2020/090806
PCT Pub. Date: May 7, 2020

(65) Prior Publication Data
US 2021/0229032 A1    Jul. 29, 2021

(30) Foreign Application Priority Data
Oct. 30, 2018   (JP) .............................. JP2018-204311

(51) Int. Cl.
*C01B 32/50* (2017.01)
*B01D 53/26* (2006.01)
(Continued)

(52) U.S. Cl.
CPC ........... *B01D 53/62* (2013.01); *B01D 53/265* (2013.01); *B01D 53/83* (2013.01); *B01D 53/96* (2013.01);
(Continued)

(58) Field of Classification Search
CPC .... B01D 53/02; B01D 53/1475; B01D 53/62; B01D 53/81; B01D 53/82; B01D 53/96;
(Continued)

(56) References Cited

U.S. PATENT DOCUMENTS 3,627,478 A * 12/1971 Tepper ................... B01D 53/02
                                                              423/230
9,878,286 B2 * 1/2018 Eisenberger ........... B01J 20/262
(Continued)

FOREIGN PATENT DOCUMENTS

JP       2013-121562 A       6/2013
KR    2018 019 866 A  *  2/2018  ......... B01D 53/1475

*Primary Examiner* — Timothy C Vanoy
(74) *Attorney, Agent, or Firm* — Oliff PLC (57) ABSTRACT

A carbon dioxide separation recovery method includes: bringing a particulate carbon dioxide adsorbent and a treatment target gas containing carbon dioxide into contact with each other to make the carbon dioxide adsorbent adsorb the carbon dioxide contained in the treatment target gas; and bringing the carbon dioxide adsorbent which has adsorbed the carbon dioxide and superheated steam into contact with each other to desorb the carbon dioxide from the carbon dioxide adsorbent and thereby regenerate the carbon dioxide adsorbent, and recovering the desorbed carbon dioxide. A saturation temperature of the superheated steam which is brought into contact with the carbon dioxide adsorbent is not (Continued)

more than a temperature of the carbon dioxide adsorbent which contacts the superheated steam. The regenerated carbon dioxide adsorbent is utilized for adsorption of the carbon dioxide again without being subjected to a drying step.

6 Claims, 2 Drawing Sheets

(51) Int. Cl.
  *B01D 53/62* (2006.01)
  *B01D 53/83* (2006.01)
  *B01D 53/96* (2006.01)

(52) U.S. Cl.
  CPC ........ *C01B 32/50* (2017.08); *B01D 2253/102* (2013.01); *B01D 2253/104* (2013.01); *B01D 2253/20* (2013.01); *B01D 2257/504* (2013.01); *B01D 2258/0283* (2013.01)

(58) Field of Classification Search
  CPC ....... B01D 2257/504; B01D 2258/0283; B01J 3/00; B01J 8/00; B01J 8/02; C01B 32/50; Y02C 20/40
  See application file for complete search history.

(56) References Cited

U.S. PATENT DOCUMENTS

| | | | |
|---|---|---|---|
| 2014/0175336 A1* | 6/2014 | Gupta | B01D 53/06 252/373 |
| 2014/0331864 A1* | 11/2014 | Ogino | B01D 53/08 96/145 |
| 2015/0007727 A1* | 1/2015 | Elliott | B01D 53/04 95/139 |
| 2017/0087510 A1* | 3/2017 | Maltais | F23J 15/003 |
| 2020/0016537 A1* | 1/2020 | Chen | C01B 3/56 |

* cited by examiner

CARBON DIOXIDE SEPARATION RECOVERY SYSTEM AND METHOD

TECHNICAL FIELD

The present invention relates to a carbon dioxide separation recovery technique of separating and recovering carbon dioxide contained in a treatment target gas by using a carbon dioxide adsorbent.

BACKGROUND ART

A carbon dioxide separation recovery system which separates and recovers carbon dioxide contained in a treatment target gas by using a carbon dioxide adsorbent has been known. For example, PTL 1 discloses this type of carbon dioxide separation recovery system.

The carbon dioxide separation recovery system of PTL 1 is a moving-bed system in which the carbon dioxide adsorbent is continuously transferred through an adsorbing tower, a regeneration tower, a drying tower, and a cooling tower in this order. In the adsorbing tower, the adsorbent and the treatment target gas containing carbon dioxide are brought into contact with each other, and with this, the carbon dioxide contained in the treatment target gas is adsorbed by the adsorbent. In the regeneration tower, the adsorbent which has adsorbed the carbon dioxide and saturated steam are brought into contact with each other, and with this, the carbon dioxide is desorbed from the adsorbent. The desorbed carbon dioxide is stored in a carbon dioxide holder. In the drying tower, the adsorbent to which condensed water of the saturated steam has adhered in the regeneration tower is dried by heating. In the cooling tower, the dried adsorbent is cooled to a temperature suitable for the adsorption of the carbon dioxide. The cooled adsorbent returns to the adsorbing tower by a conveyor.

CITATION LIST

Patent Literature

PTL 1: Japanese Laid-Open Patent Application Publication No. 2013-121562

SUMMARY OF INVENTION

Technical Problem

One example of the treatment target gas of the carbon dioxide separation recovery system is an industrial flue gas containing carbon dioxide. Regarding the treatment of such flue gas, reductions in facility cost, operational cost, and consumption energy are especially required. From this point of view, there is still room for improvement in the carbon dioxide separation recovery system of PTL 1.

The present invention was made under these circumstances, and an object of the present invention is to realize reductions in facility cost and operational cost in a carbon dioxide separation recovery technique as compared to the conventional system described in PTL 1.

Solution to Problem

In PTL 1, in order to regenerate the carbon dioxide adsorbent, saturated steam having negative pressure is supplied to a desorption reactor (regeneration tower). The saturated steam condenses on the surface of the adsorbent, and at this time, discharges condensation heat. The condensation heat is utilized as energy by which carbon dioxide is desorbed from the adsorbent. However, according to such method of regenerating the carbon dioxide adsorbent, since the condensed water adheres to the surface of the adsorbent, the drying tower which dries the adsorbents is required at a downstream side of the desorption reactor. According to the drying tower, the facility cost increases due to the installation of a treatment reactor and its incidental facilities (such as a blower and a heater), and the operational cost also increases due to large consumption energy. It should be noted that in the conventional system, since the drying tower is larger in size than each of the absorption tower and the regeneration tower, the drying tower significantly influences the size of the entire system. Moreover, since the adsorbent dried in the drying tower has a temperature higher than a temperature suitable for a carbon dioxide adsorption reaction, the cooling tower which cools the adsorbent is required at a downstream side of the drying tower. Therefore, in order to realize the reductions in the facility cost and operational cost of the carbon dioxide separation recovery system, it is effective to omit or downsize the drying tower and the cooling tower in the conventional system.

The inventors of the present application have arrived at an idea in which by adopting a carbon dioxide adsorbent regenerating method different from the method used in the carbon dioxide separation recovery system of PTL 1, the amount of condensed water adhering to the surface of the adsorbent is reduced, and the drying tower and the cooling tower in the conventional system are omitted or downsized.

A carbon dioxide separation recovery system according to one aspect of the present invention includes: an adsorption reactor into which a particulate carbon dioxide adsorbent flows; a treatment target gas supply line configured to supply a treatment target gas containing carbon dioxide to the adsorption reactor; a treated gas discharge line configured to discharge from the adsorption reactor the treatment target gas from which the carbon dioxide has been adsorbed and removed by contact with the carbon dioxide adsorbent; a desorption reactor into which the carbon dioxide adsorbent which has adsorbed the carbon dioxide in the adsorption reactor flows; a superheated steam supply line configured to supply superheated steam to the desorption reactor; a carbon dioxide recovery line configured to discharge a recovery gas from the desorption reactor, the recovery gas containing the superheated steam which has contacted the carbon dioxide adsorbent and the carbon dioxide which has been desorbed from the carbon dioxide adsorbent; and a transfer apparatus configured to transfer to the adsorption reactor the carbon dioxide adsorbent from which the carbon dioxide has been desorbed in the desorption reactor. Pressure of the superheated steam in the desorption reactor is predetermined pressure that is not more than saturated steam pressure at a temperature of the carbon dioxide adsorbent which contacts the superheated steam.

A carbon dioxide separation recovery system according to another aspect of the present invention includes: a treatment reactor filled with a particulate carbon dioxide adsorbent; a treatment target gas supply line configured to supply a treatment target gas containing carbon dioxide to the treatment reactor; a treated gas discharge line configured to discharge from the treatment reactor the treatment target gas from which the carbon dioxide has been adsorbed and removed by contact with the carbon dioxide adsorbent; a superheated steam supply line configured to supply superheated steam to the treatment reactor; a carbon dioxide recovery line configured to discharge a recovery gas from the treatment reactor, the recovery gas containing the superheated steam which has contacted the carbon dioxide adsorbent and the carbon dioxide which has been desorbed from the carbon dioxide adsorbent; and a switching apparatus configured to switch between a state where the treatment target gas supply line and the treated gas discharge line are connected to the treatment reactor and a state where the superheated steam supply line and the carbon dioxide recovery line are connected to the treatment reactor. Pressure of the superheated steam in the treatment reactor is predetermined pressure that is not more than saturated steam pressure at a temperature of the carbon dioxide adsorbent which contacts the superheated steam.

A carbon dioxide separation recovery method according to one aspect of the present invention includes: bringing a particulate carbon dioxide adsorbent and a treatment target gas containing carbon dioxide into contact with each other to make the carbon dioxide adsorbent adsorb the carbon dioxide contained in the treatment target gas; and bringing the carbon dioxide adsorbent which has adsorbed the carbon dioxide and superheated steam into contact with each other to desorb the carbon dioxide from the carbon dioxide adsorbent and thereby regenerate the carbon dioxide adsorbent, and recovering the desorbed carbon dioxide. A saturation temperature of the superheated steam which is brought into contact with the carbon dioxide adsorbent is not more than a temperature of the carbon dioxide adsorbent which contacts the superheated steam. The regenerated carbon dioxide adsorbent is utilized for adsorption of the carbon dioxide again without being subjected to a drying step.

In the above carbon dioxide separation recovery system and method, in order to regenerate the carbon dioxide adsorbent, the carbon dioxide adsorbent and the superheated steam are brought into contact with each other. Carbon dioxide partial pressure (carbon dioxide concentration) of the superheated steam is significantly lower than carbon dioxide partial pressure (carbon dioxide concentration) of the surface of the carbon dioxide adsorbent. By using the difference between these carbon dioxide partial pressures as a driving force, the carbon dioxide adsorbed by the carbon dioxide adsorbent diffuses into the superheated steam. With this, the carbon dioxide is desorbed from the carbon dioxide adsorbent, and thus, the carbon dioxide adsorbent is regenerated.

In the above, since the saturation temperature of the superheated steam which has contacted the carbon dioxide adsorbent is not more than the temperature of the carbon dioxide adsorbent, the steam does not condense on the surface of the carbon dioxide adsorbent, or even if the steam condenses, the amount of condensed water is suppressed. Therefore, the amount of condensed water adhering to the surface of the carbon dioxide adsorbent can be suppressed. In addition, the temperature increase of the carbon dioxide adsorbent by condensation heat can be suppressed. Moreover, since the superheated steam is lower in relative humidity than the saturated steam, the amount of condensed water adhering to the surface of the carbon dioxide adsorbent is further effectively reduced.

As described above, since the amount of condensed water adhering to the surface of the regenerated carbon dioxide adsorbent can be suppressed, a drying tower (and a cooling tower) included in a conventional system in order to dry the carbon dioxide adsorbent can be omitted or downsized. To be specific, the facility cost and operational cost for the drying tower (and the cooling tower) can be suppressed although those costs account for a large ratio in the conventional system. With this, the reductions in the facility cost and operational cost of the carbon dioxide separation recovery system can be realized.

In the above carbon dioxide separation recovery system, the carbon dioxide recovery line may include a condenser configured to condense moisture contained in the recovery gas.

In the above carbon dioxide separation recovery system, the moisture supplied to the desorption reactor through the superheated steam supply line does not condense on the surface of the carbon dioxide adsorbent, and most of the moisture flows out to the carbon dioxide recovery line. Therefore, the recovery gas flowing into the carbon dioxide recovery line contains a large amount of moisture. Since part or all of the moisture is condensed by the condenser to be removed from the recovery gas, the carbon dioxide concentration of the recovery gas can be increased.

In the above carbon dioxide separation recovery system, the carbon dioxide recovery line may include a compression pump configured to compress the recovery gas and a carbon dioxide holder configured to store the compressed recovery gas, and the compression pump may perform forced air suction with respect to the adsorption reactor or the treatment reactor such that pressure in the adsorption reactor or the treatment reactor becomes the predetermined pressure.

With this, the carbon dioxide contained in the recovery gas can be recovered as high-concentration carbon dioxide in the carbon dioxide holder, and the pressure of the superheated steam which contacts the carbon dioxide adsorbent can be adjusted to the predetermined pressure.

In the above carbon dioxide separation recovery system, a temperature of the superheated steam may be higher than the temperature of the carbon dioxide adsorbent which contacts the superheated steam.

With this, when the amount of steam supplied is constant, the humidity of the superheated steam decreases as the absolute temperature of the superheated steam increases. Therefore, the amount of steam condensed on the surface of the carbon dioxide adsorbent can be suppressed.

Advantageous Effects of Invention

According to the present invention, reductions in facility cost and operational cost in a carbon dioxide separation recovery technique can be realized by omitting or downsizing a drying tower and a cooling tower included in a conventional system.

DESCRIPTION OF EMBODIMENTS

A carbon dioxide separation recovery system according to the present invention performs: a treatment in which a particulate carbon dioxide adsorbent (hereinafter simply referred to as an "adsorbent") and a treatment target gas containing carbon dioxide are brought into contact with each other, and with this, the carbon dioxide is adsorbed by the adsorbent; and a treatment in which the adsorbent which has adsorbed the carbon dioxide and superheated steam are brought into contact with each other, and with this, the carbon dioxide is desorbed (removed) from the adsorbent, and as a result, the adsorbent is regenerated. The carbon dioxide which has been desorbed from the adsorbent is recovered.

A treatment target gas is, for example, a flue gas. The adsorbent is, for example, a porous substance impregnated with amine. Examples of the porous substance include activated carbon and activated alumina. Hereinafter, Embodiments 1 and 2 of the present invention will be described with reference to the drawings.

Embodiment 1

Figure 1:
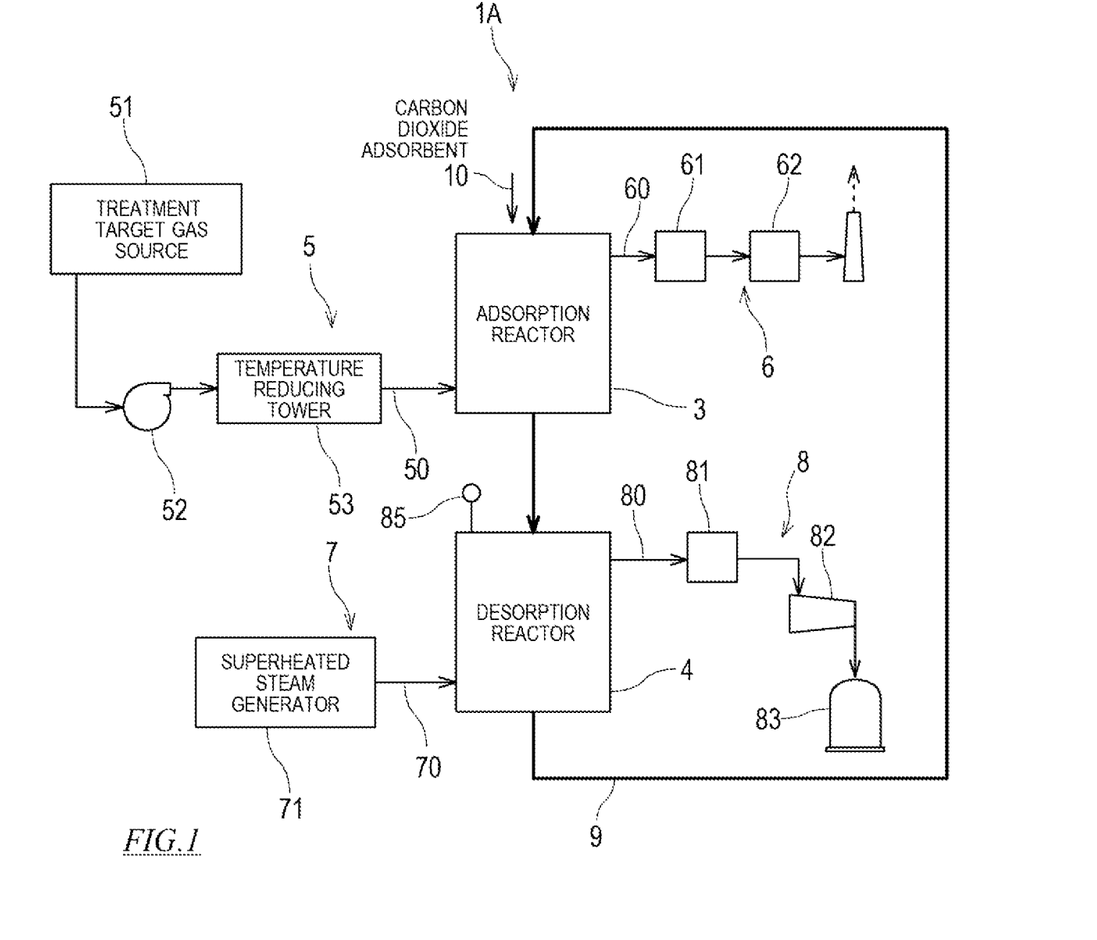
FIG. 1 is a block diagram showing an entire configuration of a carbon dioxide separation recovery system according to Embodiment 1 of the present invention.

FIG. 1 is a block diagram showing an entire configuration of a carbon dioxide separation recovery system 1A according to Embodiment 1 of the present invention. The carbon dioxide separation recovery system 1A shown in FIG. 1 is a system including a plurality of moving-bed treatment reactors (an adsorption reactor 3 and a desorption reactor 4).

The carbon dioxide separation recovery system 1A includes the adsorption reactor 3, the desorption reactor 4, a treatment target gas supply line 5, a treated gas discharge line 6, a superheated steam supply line 7, a carbon dioxide recovery line 8, and a transfer apparatus 9.

An adsorbent 10 conveyed by the transfer apparatus 9 is supplied to the adsorption reactor 3 through an upper inlet at a predetermined supply rate. A hopper (not shown) configured to temporarily store the adsorbent 10 may be provided above the adsorption reactor 3, and the adsorbent 10 may be supplied to the adsorption reactor 3 through the hopper. In the adsorption reactor 3, the adsorbent 10 is supplied through the upper inlet and discharged through a lower outlet, and therefore, the adsorbent 10 moves from an upper side to a lower side at a predetermined rate.

The treatment target gas supply line 5 is connected to a lower portion of the adsorption reactor 3. The treatment target gas supply line 5 includes a channel 50, a blower 52, and a temperature reducing tower 53. The treatment target gas supplied from a treatment target gas source 51 to the adsorption reactor 3 flows through the channel 50. The blower 52 and the temperature reducing tower 53 are provided at the channel 50. The treatment target gas containing carbon dioxide is supplied from the treatment target gas source 51 to the adsorption reactor 3 by the blower 52. In the temperature reducing tower 53, the treatment target gas is cooled to a temperature suitable for a carbon dioxide adsorption reaction.

A countercurrent moving bed where the treatment target gas flowing upward and the adsorbent 10 moving downward continuously contact each other is formed at the adsorption reactor 3. When the treatment target gas and the adsorbent 10 are brought into contact with each other, the adsorbent 10 selectively adsorbs the carbon dioxide contained in the treatment target gas. At this time, the temperature of the adsorbent 10 is, for example, 40° C.

The treated gas discharge line 6 is connected to an upper portion of the adsorption reactor 3. The treated gas discharge line 6 includes a channel 60, a heater 61, and a filter 62. A treated gas discharged from the adsorption reactor 3 flows through the channel 60. The heater 61 and the filter 62 are provided at the channel 60. The treatment target gas (i.e., the treated gas) from which the carbon dioxide has been adsorbed and removed by contact with the adsorbent 10 flows out to the treated gas discharge line 6 and is warmed by the heater 61 to suppress white smoke. Then, powder dust is removed from the treatment target gas by the filter 62, and the treatment target gas is discharged to an atmosphere.

The desorption reactor 4 is arranged under the adsorption reactor 3. The lower outlet of the adsorption reactor 3 and an upper inlet of the desorption reactor 4 are connected to each other through a pressure switching apparatus (not shown), such as a lock hopper. The adsorbent 10 discharged from the adsorption reactor 3 flows into the desorption reactor 4 through the upper inlet by its own weight. In the desorption reactor 4, the adsorbent 10 which has adsorbed the carbon dioxide moves from an upper side to a lower side at a predetermined rate.

The superheated steam supply line 7 is connected to a lower portion of the desorption reactor 4. The superheated steam supply line 7 includes a superheated steam generator 71 and a channel 70 through which superheated steam is supplied from the superheated steam generator 71 to the desorption reactor 4. The superheated steam generated by the superheated steam generator 71 is supplied to the lower portion of the desorption reactor 4. A countercurrent moving bed where the superheated steam flowing upward and the adsorbent 10 moving downward continuously contact each other is formed in the desorption reactor 4.

In the desorption reactor 4, carbon dioxide partial pressure (carbon dioxide concentration) of the superheated steam which contacts the adsorbent 10 is significantly lower than carbon dioxide partial pressure (carbon dioxide concentration) of the surface of the adsorbent 10. By using the difference between these carbon dioxide partial pressures as a driving force, the carbon dioxide which has been adsorbed by the adsorbent 10 diffuses into the superheated steam. As above, by using the difference between the carbon dioxide partial pressure of the superheated steam and the carbon dioxide partial pressure of the surface of the adsorbent 10 as the driving force, the carbon dioxide is desorbed from the adsorbent 10, and thus, the adsorbent 10 is regenerated.

The carbon dioxide recovery line 8 is connected to an upper portion of the desorption reactor 4. The carbon dioxide recovery line 8 includes a carbon dioxide holder 83, a channel 80, a condenser 81, and a compression pump 82. A recovery gas supplied from the desorption reactor 4 to the carbon dioxide holder 83 flows through the channel 80. The condenser 81 and the compression pump 82 are provided at the channel 80. The recovery gas is a gas containing the superheated steam and the carbon dioxide which has been desorbed from the adsorbent 10. The recovery gas flows out from the desorption reactor 4 to the carbon dioxide recovery line 8 by forced air suction of the compression pump 82. Moisture contained in the recovery gas is condensed and removed by the condenser 81. The recovery gas from which the moisture has been removed is compressed by the compression pump 82, and with this, the recovery gas becomes high-concentration carbon dioxide and is then recovered by the carbon dioxide holder 83.

It should be noted that pressure in the desorption reactor 4 is detected by a pressure gauge 85 provided at the desorption reactor 4. The forced air suction of the compression pump 82 with respect to the desorption reactor 4 is performed such that the detected pressure becomes below-described predetermined pressure. To be specific, the pressure of the superheated steam that contacts the adsorbent 10 is adjusted to predetermined pressure by the operation of the compression pump 82. A rotational frequency of the compression pump 82 may be manually adjusted or may be controlled by a controller (not shown) such that the pressure value detected by the pressure gauge 85 becomes the predetermined pressure.

The regenerated adsorbent 10 is discharged from a lower outlet of the desorption reactor 4 and is returned to the inlet of the adsorption reactor 3 by the transfer apparatus 9. The transfer apparatus 9 may be, for example, a conveyor. While the adsorbent 10 is being transferred by the transfer apparatus 9, the temperature of the adsorbent 10 decreases due to heat release to about 40° C. that is an adsorption temperature of the carbon dioxide in the adsorption reactor 3. It should be noted that when the temperature of the adsorbent 10 does not decrease to the adsorption temperature while the adsorbent 10 is being transferred by the transfer apparatus 9, a cooling tank (not shown) may be provided at a portion of the transfer apparatus 9.

As above, the carbon dioxide separation recovery system 1A includes: the adsorption reactor 3 into which the particulate adsorbent 10 flows; the treatment target gas supply line 5 configured to supply the treatment target gas containing carbon dioxide to the adsorption reactor 3; the treated gas discharge line 6 configured to discharge from the adsorption reactor 3 the treatment target gas from which the carbon dioxide has been adsorbed and removed by contact with the adsorbent 10; the desorption reactor 4 into which the adsorbent 10 which has adsorbed the carbon dioxide in the adsorption reactor 3 flows; the superheated steam supply line 7 configured to supply the superheated steam to the desorption reactor 4; the carbon dioxide recovery line 8 configured to discharge from the desorption reactor 4 the superheated steam containing the carbon dioxide, which has been desorbed from the adsorbent 10, by contact with the adsorbent 10; and the transfer apparatus 9 configured to transfer to the adsorption reactor 3 the adsorbent 10 from which the carbon dioxide has been desorbed in the desorption reactor 4.

Moreover, a carbon dioxide separation recovery method executed by the carbon dioxide separation recovery system 1A configured as above includes: bringing the particulate adsorbent 10 and the treatment target gas containing carbon dioxide into contact with each other to make the adsorbent 10 adsorb the carbon dioxide contained in the treatment target gas; and bringing the adsorbent 10 which has adsorbed the carbon dioxide and the superheated steam into contact with each other to desorb the carbon dioxide from the adsorbent 10 and thereby regenerate the adsorbent 10 and recover the desorbed carbon dioxide. The regenerated adsorbent 10 is utilized for the adsorption of the carbon dioxide again without being subjected to a drying step.

The carbon dioxide separation recovery system 1A has a feature in which the pressure of the superheated steam in the desorption reactor 4 is predetermined pressure that is not more than saturated steam pressure at a temperature of the adsorbent 10 which contacts the superheated steam. Similarly, the carbon dioxide separation recovery system has a feature in which a saturation temperature of the superheated steam which contacts the adsorbent 10 is not more than the temperature of the adsorbent 10 which contacts the superheated steam. It should be noted that "the temperature of the adsorbent 10 which contacts the superheated steam" may be an average temperature of the adsorbent 10 in the desorption reactor 4, a temperature of the adsorbent 10 at the upper inlet of the desorption reactor 4, or a temperature of the adsorbent 10 at a vertically intermediate position in the desorption reactor 4. A lower limit of the saturation temperature of the superheated steam is not especially limited. In consideration of drying efficiency of the adsorbent 10, the lower limit of the saturation temperature of the superheated steam may be set to a temperature that is lower by about 15° C. than the temperature of the adsorbent 10 which contacts the superheated steam.

For example, when the temperature of the adsorbent 10 in the desorption reactor 4 is about 60° C., the superheated steam having a temperature of about 70° C. is brought into contact with the adsorbent 10. The saturation temperature of the superheated steam is about 50° C. In order to do this, the pressure in the desorption reactor 4 is reduced by the compression pump 82 so as to become absolute pressure of about 12 KPa, and the superheated steam generator 71 further heats dry saturated steam to generate the superheated steam of about 70° C. It should be noted that the temperature of the superheated steam may be the temperature of the superheated steam supplied to the desorption reactor 4.

Moreover, for example, when the temperature of the adsorbent 10 in the desorption reactor 4 is about 60° C., the superheated steam having a temperature of about 70° C. is brought into contact with the adsorbent 10. The saturation temperature of the superheated steam is about 60° C. In order to do this, the pressure in the desorption reactor 4 is reduced by the compression pump 82 so as to become absolute pressure of about 20 KPa, and the superheated steam generator 71 further heats dry saturated steam to generate the superheated steam of about 70° C.

As described above, since the saturation temperature of the superheated steam which has contacted the adsorbent 10 is not more than the temperature of the adsorbent 10, the steam does not condense on the surface of the adsorbent 10, or even if the steam condenses, the amount of condensed water is suppressed. Therefore, the amount of condensed water adhering to the surface of the adsorbent 10 can be suppressed. In addition, the temperature increase of the adsorbent 10 by condensation heat can be suppressed.

It is desirable that the temperature of the superheated steam be higher than the temperature of the adsorbent 10 which contacts the superheated steam. An upper limit of the temperature of the superheated steam is not especially limited. In consideration of generation energy of the superheated steam, operation energy of the compression pump 82, and the temperature of the regenerated adsorbent 10, the upper limit of the temperature of the superheated steam may be set to a temperature higher by about 20° C. to 30° C. than the temperature of the adsorbent 10 which contacts the superheated steam.

Moreover, since the superheated steam is lower in relative humidity than the saturated steam, the amount of condensed water adhering to the surface of the adsorbent 10 is effectively reduced. When the amount of steam supplied is constant, the humidity of the superheated steam decreases as the absolute temperature of the superheated steam increases. Therefore, as above, the temperature of the superheated steam is made higher than the temperature of the adsorbent 10 which contacts the superheated steam, and with this, the amount of steam condensed on the surface of the carbon dioxide adsorbent can be further effectively suppressed.

As above, since the amount of condensed water adhering to the surface of the regenerated adsorbent 10 can be suppressed, a drying tower (and a cooling tower) included in a conventional system in order to dry the adsorbent 10 can be omitted or downsized. To be specific, the facility cost and operational cost for the drying tower (and the cooling tower) can be suppressed although those costs account for a large ratio in the conventional system. With this, the reductions in the facility cost and operational cost of the carbon dioxide separation recovery system 1A can be realized.

It should be noted that in the carbon dioxide separation recovery system 1A, the moisture supplied through the superheated steam supply line 7 to the desorption reactor 4 does not condense on the surface of the adsorbent 10, and most of the moisture flows out to the carbon dioxide recovery line 8. Therefore, the recovery gas flowing into the carbon dioxide recovery line 8 contains a large amount of steam. On this account, the carbon dioxide recovery line 8 includes the condenser 81 configured to condense the moisture contained in the recovery gas. Part or all of the moisture of the recovery gas flowing into the carbon dioxide recovery line 8 is removed by the condenser 81. As a result, the carbon dioxide concentration of the recovery gas recovered by the carbon dioxide holder 83 can be increased. Moreover, since the recovery gas in which the amount of moisture has been reduced flows into the compression pump 82, a load change of the compression pump 82 can be suppressed, and the carbon dioxide separation recovery system 1A can operate stably.

Embodiment 2

Figure 2:
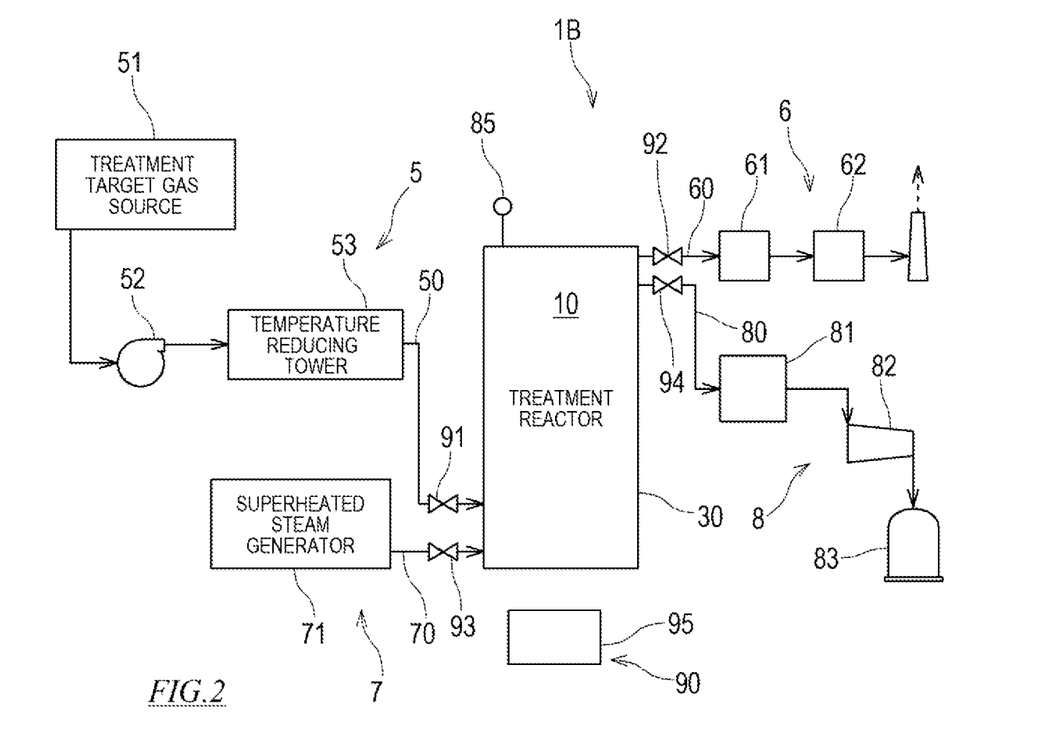
FIG. 2 is a block diagram showing an entire configuration of the carbon dioxide separation recovery system according to Embodiment 2 of the present invention.

Next, Embodiment 2 of the present invention will be described. FIG. 2 is a block diagram showing an entire configuration of a carbon dioxide separation recovery system 1B according to Embodiment 2 of the present invention. In the description of Embodiment 2, the same reference signs are used for the same or corresponding components as in Embodiment 1, and a repetition of the same explanation is avoided.

The carbon dioxide separation recovery system 1B shown in FIG. 2 is a system including a fixed-bed treatment reactor 30. According to the carbon dioxide separation recovery system 1B, in the single treatment reactor 30, a treatment in which the adsorbent 10 adsorbs carbon dioxide and a treatment in which the adsorbent 10 is regenerated by desorbing the carbon dioxide from the adsorbent 10 are performed.

The carbon dioxide separation recovery system 1B includes: the treatment reactor 30 filled with the particulate adsorbent 10; the treatment target gas supply line 5 configured to supply the treatment target gas containing carbon dioxide to the treatment reactor 30; the treated gas discharge line 6 configured to discharge from the treatment reactor 30 the treatment target gas from which the carbon dioxide has been adsorbed and removed by contact with the adsorbent 10; the superheated steam supply line 7 configured to supply the superheated steam to the treatment reactor 30; and the carbon dioxide recovery line 8 configured to discharge the recovery gas from the treatment reactor 30, the recovery gas containing the superheated steam which has contacted the adsorbent 10 and the carbon dioxide which has been desorbed from the adsorbent 10.

The treatment target gas supply line 5 and the superheated steam supply line 7 are selectively connected to a lower portion of the treatment reactor 30. Moreover, the treated gas discharge line 6 and the carbon dioxide recovery line 8 are selectively connected to an upper portion of the treatment reactor 30.

The carbon dioxide separation recovery system 1B further includes a switching apparatus 90 configured to switch between a state where the treatment target gas supply line 5 and the treated gas discharge line 6 are connected to the treatment reactor 30 and a state where the superheated steam supply line 7 and the carbon dioxide recovery line 8 are connected to the treatment reactor 30.

The switching apparatus 90 according to the present embodiment includes switching valves 91, 92, 93, and 94 and a switching controller 95. The switching valves 91, 92, 93, and 94 are provided at respective connection portions between the treatment reactor 30 and the respective lines that are the treatment target gas supply line 5, the treated gas discharge line 6, the superheated steam supply line 7, and the carbon dioxide recovery line 8. The switching controller 95 opens or closes the switching valves 91, 92, 93, and 94. It should be noted that the configuration of the switching apparatus 90 is not limited to the present embodiment. For example, manual switching valves may be provided instead of the switching valves 91, 92, 93, and 94.

The carbon dioxide separation recovery system 1B configured as above performs a treatment in which when the treatment target gas supply line 5 and the treated gas discharge line 6 are connected to the treatment reactor 30, the adsorbent 10 and the treatment target gas are brought into contact with each other in the treatment reactor 30, and with this, the adsorbent 10 adsorbs the carbon dioxide contained in the treatment target gas. The treatment target gas (i.e., the treated gas) from which the carbon dioxide has been adsorbed and removed is discharged through the treated gas discharge line 6 to an outside of the system.

Then, the switching apparatus 90 switches to the state where the superheated steam supply line 7 and the carbon dioxide recovery line 8 are connected to the treatment reactor 30, and the carbon dioxide separation recovery system 1B performs a treatment in which the superheated steam and the adsorbent 10 which has adsorbed the carbon dioxide are brought into contact with each other, and with this, the carbon dioxide is desorbed from the adsorbent 10, and as a result, the adsorbent 10 is regenerated. The recovery gas containing the carbon dioxide which has been desorbed from the adsorbent is discharged from the treatment reactor 30 to the carbon dioxide recovery line 8. The moisture contained in the recovery gas is condensed and removed by the condenser 81. Then, the recovery gas is compressed by the compression pump 82 to become high-concentration carbon dioxide and is recovered by the carbon dioxide holder 83.

In the carbon dioxide separation recovery system 1B according to Embodiment 2, as with the carbon dioxide separation recovery system 1A according to Embodiment 1, the pressure of the superheated steam in the treatment reactor 30 is predetermined pressure that is not more than the saturated steam pressure at the temperature of the adsorbent 10 which contacts the superheated steam, and similarly, the saturation temperature of the superheated steam which is brought into contact with the adsorbent 10 is not more than the temperature of the adsorbent 10 which contacts the superheated steam. The pressure in the treatment reactor 30 is detected by the pressure gauge 85 provided at the treatment reactor 30, and forced air suction of the compression pump 82 with respect to the treatment reactor 30 is performed such that the detected pressure becomes predetermined pressure. It should be noted that "the temperature of the adsorbent 10 which contacts the superheated steam" may be an average temperature of the adsorbent 10 in the treatment reactor 30, a temperature of the adsorbent 10 at an upper inlet of the treatment reactor 30, or a temperature of the adsorbent 10 at a vertically intermediate position of the treatment reactor 30. Moreover, the lower limit of the saturation temperature of the superheated steam is not especially limited. In consideration of the drying efficiency of the adsorbent 10, the lower limit of the saturation temperature of the superheated steam may be set to a temperature that is lower by about 15° C. than the temperature of the adsorbent 10 which contacts the superheated steam.

As described above, since the saturation temperature of the superheated steam which has contacted the adsorbent 10 is not more than the temperature of the adsorbent 10, the steam does not condense on the surface of the adsorbent 10, or even if the steam condenses, the amount of condensed water is suppressed. Therefore, the amount of condensed water adhering to the surface of the adsorbent 10 can be suppressed. In addition, the temperature increase of the adsorbent 10 by the condensation heat can be suppressed.

Moreover, since the superheated steam is lower in relative humidity than the saturated steam, the condensed water adhering to the surface of the adsorbent 10 is effectively reduced.

As above, since the amount of condensed water adhering to the surface of the regenerated adsorbent 10 can be suppressed, a drying line for drying the regenerated adsorbent 10 can be omitted or downsized. It should be noted that a conventional drying line is constituted by, for example, a drying air generator and a blower configured to supply drying air to the adsorbent 10. As above, the facility cost and operational cost for drying the regenerated adsorbent 10 can be suppressed. With this, the reductions in the facility cost and operational cost of the carbon dioxide separation recovery system 1B can be realized.

The foregoing has described preferred embodiments of the present invention. Modifications of specific structures and/or functional details of the above embodiments are included in the present invention as long as they are within the scope of the present invention.

REFERENCE SIGNS LIST 1A, 1B carbon dioxide separation recovery system
3 adsorption reactor
4 desorption reactor
5 treatment target gas supply line
6 treated gas discharge line
7 superheated steam supply line
8 carbon dioxide recovery line
9 transfer apparatus
10 adsorbent
30 treatment reactor
51 treatment target gas source
52 blower
53 temperature reducing tower
61 heater
62 filter
71 superheated steam generator
81 condenser
82 compression pump
83 carbon dioxide holder
85 pressure gauge
90 switching apparatus
91 to 94 switching valve
95 switching controller

The invention claimed is:

1. A carbon dioxide separation recovery system comprising:
an adsorption reactor into which a particulate carbon dioxide adsorbent flows;
a treatment target gas supply line configured to supply a treatment target gas containing carbon dioxide to the adsorption reactor;
a treated gas discharge line configured to discharge from the adsorption reactor the treatment target gas from which the carbon dioxide has been adsorbed and removed by contact with the carbon dioxide adsorbent;
a desorption reactor into which the carbon dioxide adsorbent which has adsorbed the carbon dioxide in the adsorption reactor flows;
a superheated steam supply line configured to supply superheated steam to the desorption reactor;
a carbon dioxide recovery line configured to discharge a recovery gas from the desorption reactor, the recovery gas containing the superheated steam which has contacted the carbon dioxide adsorbent and the carbon dioxide which has been desorbed from the carbon dioxide adsorbent; and
a transfer apparatus configured to transfer to the adsorption reactor the carbon dioxide adsorbent from which the carbon dioxide has been desorbed in the desorption reactor, wherein
pressure of the superheated steam in the desorption reactor is predetermined pressure that is not more than saturated steam pressure at a temperature of the carbon dioxide adsorbent which contacts the superheated steam.

2. A carbon dioxide separation recovery system comprising:
a treatment reactor filled with a particulate carbon dioxide adsorbent;
a treatment target gas supply line configured to supply a treatment target gas containing carbon dioxide to the treatment reactor;
a treated gas discharge line configured to discharge from the treatment reactor the treatment target gas from which the carbon dioxide has been adsorbed and removed by contact with the carbon dioxide adsorbent;
a superheated steam supply line configured to supply superheated steam to the treatment reactor;
a carbon dioxide recovery line configured to discharge a recovery gas from the treatment reactor, the recovery gas containing the superheated steam which has contacted the carbon dioxide adsorbent and the carbon dioxide which has been desorbed from the carbon dioxide adsorbent; and
a switching apparatus configured to switch between a state where the treatment target gas supply line and the treated gas discharge line are connected to the treatment reactor and a state where the superheated steam supply line and the carbon dioxide recovery line are connected to the treatment reactor, wherein
pressure of the superheated steam in the treatment reactor is predetermined pressure that is not more than saturated steam pressure at a temperature of the carbon dioxide adsorbent which contacts the superheated steam.

3. The carbon dioxide separation recovery system according to claim 1, wherein the carbon dioxide recovery line includes a condenser configured to condense moisture contained in the recovery gas.

4. The carbon dioxide separation recovery system according to claim 1, wherein:
the carbon dioxide recovery line includes
a compression pump configured to compress the recovery gas and
a carbon dioxide holder configured to store the compressed recovery gas; and
the compression pump performs forced air suction with respect to the adsorption reactor or the treatment reactor such that pressure in the adsorption reactor or the treatment reactor becomes the predetermined pressure.

5. The carbon dioxide separation recovery system according to claim 1, wherein a temperature of the superheated steam is higher than the temperature of the carbon dioxide adsorbent which contacts the superheated steam.

6. A carbon dioxide separation recovery method comprising:
- bringing a particulate carbon dioxide adsorbent and a treatment target gas containing carbon dioxide into contact with each other to make the carbon dioxide adsorbent adsorb the carbon dioxide contained in the treatment target gas; and
- bringing the carbon dioxide adsorbent which has adsorbed the carbon dioxide and superheated steam into contact with each other to desorb the carbon dioxide from the carbon dioxide adsorbent and thereby regenerate the carbon dioxide adsorbent, and recovering the desorbed carbon dioxide, wherein:
- a saturation temperature of the superheated steam which is brought into contact with the carbon dioxide adsorbent is not more than a temperature of the carbon dioxide adsorbent which contacts the superheated steam; and
- the regenerated carbon dioxide adsorbent is utilized for adsorption of the carbon dioxide again without being subjected to a drying step.

\* \* \* \* \*